(12) United States Patent
Hagano et al.

(10) Patent No.: US 6,321,801 B1
(45) Date of Patent: Nov. 27, 2001

(54) FUEL SUPPLY APPARATUS FOR FUEL TANK

(75) Inventors: Hiroyuki Hagano, Inazawa; Masayuki Nakagawa, Iwakura, both of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/670,564

(22) Filed: Sep. 27, 2000

(30) Foreign Application Priority Data

Sep. 30, 1999 (JP) .................................................. 11-278575

(51) Int. Cl.⁷ ........................................................... B65B 1/04
(52) U.S. Cl. .................................. 141/301; 220/DIG. 33; 220/304; 220/295
(58) Field of Search ..................................... 141/301, 349, 141/350; 220/DIG. 33, 304, 295, 86.2

(56) References Cited

U.S. PATENT DOCUMENTS

| | | |
|---|---|---|
| 5,791,507 | 8/1998 | Harris et al. . |
| 5,794,806 | 8/1998 | Harris et al. . |
| 5,829,620 | 11/1998 | Harris et al. . |
| 6,003,709 | * 12/1999 | Hagano et al. ..................... 220/88.1 |

* cited by examiner

Primary Examiner—Steven O. Douglas
(74) Attorney, Agent, or Firm—Pillsbury Winthrop LLP (57) ABSTRACT

A fuel supply apparatus having excellent operatability in opening and closing a fuel tank cap and enhanced sealing properties of the fuel tank from outside air is disclosed. The fuel supply apparatus for the fuel tank includes a casing main body detachably attached to the inlet pipe; a handle mounted on the casing main body to open and close a fuel path; a sealing member interposed between the casing main body and an inner wall of the inlet pipe; and a cam unit that presses the sealing member and expands a diameter of the sealing member with an operating force of the handle in a closing direction, so as to seal the casing main body against the inlet pipe.

15 Claims, 9 Drawing Sheets

FUEL SUPPLY APPARATUS FOR FUEL TANK

BACKGROUND OF THE INVENTION

1. Field of the Invention

The present invention relates to a fuel supply apparatus, through which fuel is supplied to a tank through a fuel path of a fuel inlet pipe.

2. Description of the Related Art

In a fuel supply apparatus, a fuel tank cap must be removed to supply fuel through the fuel inlet pipe. The fuel tank cap has a gasket pressed against an opening (filler neck) of the fuel inlet pipe, in order to prevent fuel vapor in the fuel tank from being released to the air. The fuel tank cap has the gasket mounted on an outer circumference of a cylindrical casing main body. The gasket receives a torsional force and is in close contact with the filler neck for sealing when the fuel tank cap is screwed in place within the inlet opening of the filler neck.

Conventional fuel supply apparatus exhibit poor operability in opening and closing the fuel tank cap. Specifically an undesirably large torsional force is required to close the fuel tank cap. Moreover, the torsional force is generally not uniform over the whole gasket, which interferes with desired enhancements of the sealing properties.

Another problem is that a fuel supply nozzle may collide with the seat surface, which is sealed with the gasket, when the fuel supply nozzle is inserted through the inlet opening. Damage to the seat surface generally leads to reduced sealing properties.

SUMMARY OF THE INVENTION

An object of the present invention is to provide a fuel supply apparatus that has excellent opening and closing functions with enhanced sealing properties of the fuel tank from outside air.

At least part of the above and other related objects is attained by a fuel supply apparatus through which fuel is supplied to a tank, in which the fuel is stored, through a fuel path defined by an inlet pipe. The fuel supply apparatus includes a casing main body detachably attached to the inlet pipe; a handle mounted on the casing main body to open and close the fuel path; a ring-shaped sealing member interposed between the casing main body and an inner wall of the inlet pipe; and a diameter expansion unit that presses the sealing member and expands its diameter as a result of the operating force of the handle when moved in a closing direction, which seals the casing main body against the inlet pipe.

In the fuel supply apparatus according to the present invention, movement of the handle in an opening direction causes the casing main body to be detached from the inlet pipe and when removed enables a fuel supply nozzle to be inserted to supply fuel into the tank through the fuel path defined by the inlet pipe. Moving the handle in a closing direction, on the other hand, causes the casing main body to be attached to the inlet pipe. The diameter expansion unit then presses the sealing member and expands the diameter of the sealing member. The expansion of the diameter of the sealing member forms a seal between the casing main body and the inlet pipe. The sealing member seals the casing main body against the inlet pipe by taking advantage of the pressing force, and is not subject to the torsional force discussed in the prior art. This arrangement of the present invention ensures uniform sealing.

In accordance with one embodiment of the present fuel supply apparatus, the diameter expansion unit includes a seal pressing member that presses the sealing member to expand the diameter of the sealing member and a cam unit that converts rotational force of the casing main body into a force pressing the sealing member against the seal pressing member.

In this structure, it is further preferable that the cam unit includes an upper cam formed on an outer circumference of the casing main body, the seal pressing member having a lower cam formed on the seal pressing member and pressed by the upper cam to move downwardly, and a guide member mounted on the inlet pipe with a guide groove, that guides both the upper cam and the lower cam.

In another embodiment, the upper cam has an engagement projection on its lower surface, and the lower cam has an engagement recess on its upper surface to receive the engagement projection. The engagement recess moves integrally with the engagement projection when the upper cam and the lower cam come off the guide groove.

The sealing member may be attached to an outer circumference of the casing main body.

In accordance with another embodiment of the present invention, the sealing member is pressed by the seal pressing member to perform a sealing function, and includes a rubber seal member having a circular spring chamber, and a restoration spring disposed in the spring chamber.

The restoration spring includes a circular upper ring, a circular lower ring arranged apart from the upper ring by a predetermined distance, and a joint spring that connects the upper ring with the lower ring and generates a pressing force when a compressive force is applied to the upper ring and the lower ring.

In accordance with another embodiment of the present invention, the sealing member includes a rubber seal member having a pressure groove with a V-shaped cross section, wherein an end of the seal pressing member fits in the pressure groove.

It is preferable that a lubricant be applied on the surface of the pressure groove to provide for a smoother movement of the seal pressing member.

It is further preferable that the rubber seal member has a restoration projection which protrudes from a bottom face of the pressure groove and which generates a restoring force when pressed by the seal pressing member.

In accordance with still another preferable embodiment of the present invention, the sealing member generates a restoring force by taking advantage of air pressure within an airtight rubber seal member included therein when the sealing member is pressed by the seal pressing member.

The fuel supply apparatus may further include a pressure regulation valve disposed in the casing main body and which regulates pressure in the fuel tank within a predetermined range.

In accordance with another preferable application of the present invention, the fuel supply apparatus further has a seat surface, on which the sealing member is seated. The seat surface is formed at a specific position that does not contact with a fuel supply nozzle inserted into the fuel path. This arrangement protects the seat surface from damage by the fuel supply nozzle inserted into the fuel path, thus maintaining the high sealing properties.

The structure of the present invention has a seat surface located inside the inlet pipe, which is sealed with the sealing member. Compared with the prior art structure that seals in the vicinity of the inlet opening of the inlet pipe, this present arrangement desirably reduces the required size of the sealing member and attains excellent sealing properties with smaller force.

The diameter expansion unit converts the rotational force of the casing main body into a force pressing the sealing member against the seat surface to enhance sealing properties. The sealing member is, accordingly, compressed toward the seat surface and generates high sealing properties. This arrangement is free from the frictional force and the resulting torsional force of the prior art structure, and ensures a high degree of freedom in sealing member material, surface treatment, e.g. surface conditions, and shape required to attain the high sealing properties.

The present invention is also directed to another fuel supply apparatus through which fuel is supplied to a tank, in which the fuel is stored, through a fuel path defined by an inlet pipe. This fuel supply apparatus includes a casing main body detachably attached to the inlet pipe; a handle mounted on the casing main body to open and close the fuel path; a sealing member attached to an outer wall of the casing main body and has a ring-shaped seal rubber member. When pressed in an axial direction, the sealing member expands in a radial direction to be in close contact with an inner wall of the inlet pipe and thereby seals the casing main body against the inlet pipe. This fuel supply apparatus also includes a seal pressing member that presses the sealing member and expands a diameter of the sealing member and a cam unit that converts rotational force of the casing main body into a force of pressing the sealing member via the seal pressing member. The cam unit includes an upper cam disposed on the casing main body; a seal pressing member having a lower cam formed thereon and pressed by the upper cam to move downwardly; and a guide member mounted on the inlet pipe and having a guide groove, which guides both the upper cam and the lower cam. The guide groove guides the lower cam to press the sealing member against the seal pressing member in response to a rotation of the casing main body in a closing direction.

These and other objects, features, aspects, and advantages of the present invention will become more apparent from the following detailed description of the preferred embodiments with the accompanying drawings.

DESCRIPTION OF THE PRESENT INVENTION

Figure 1:
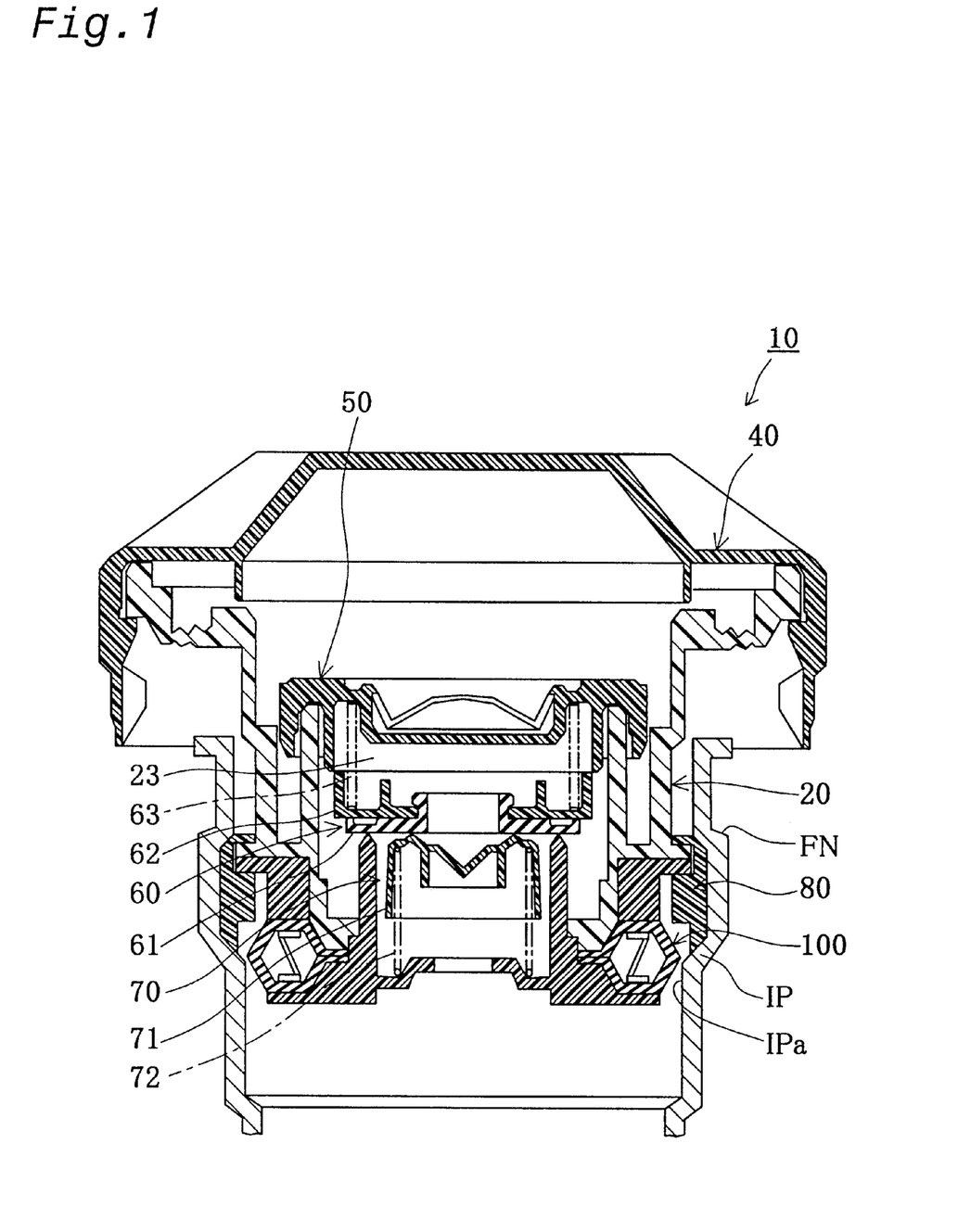
FIG. 1 is a sectional view illustrating a fuel supply mechanism including a fuel tank cap of one embodiment of the present invention.
Figure 2:
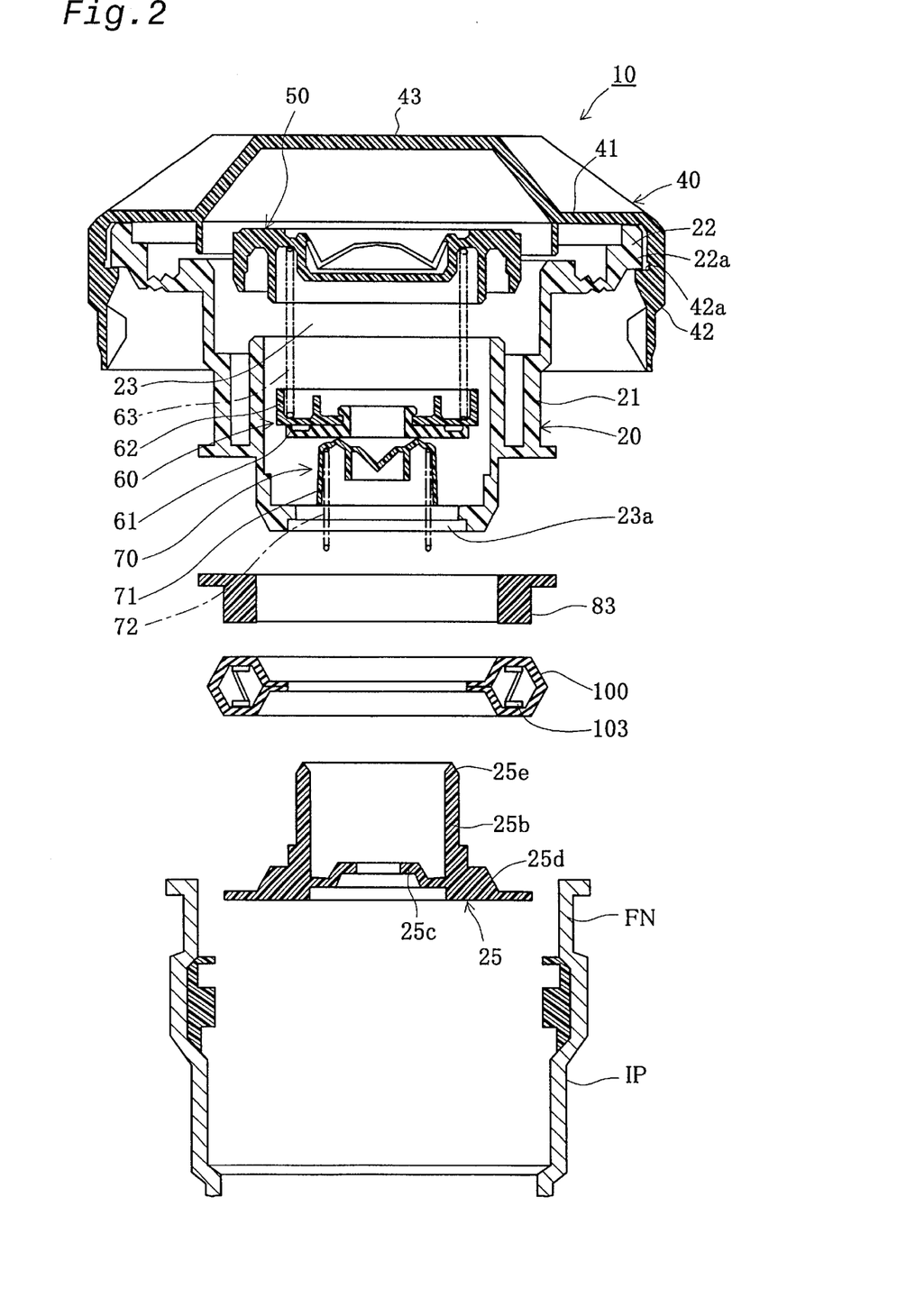
FIG. 2 is a blown-up sectional view illustrating the fuel tank cap.

FIG. 1 is a sectional view illustrating a fuel supply mechanism including a fuel tank cap 10 of one embodiment of the present invention. FIG. 2 is a decomposed sectional view illustrating the fuel tank cap 10. Referring to FIG. 1 and FIG. 2, the fuel tank cap 10 is attached to a filler neck FN of an inlet pipe IP, through which fuel is fed to a fuel tank (not shown). The fuel tank cap 10 includes a casing main body 20 made of a synthetic resin material, such as polyacetal, a cover 40 attached to an upper part of the casing main body 20 and made of a synthetic resin material, such as nylon, an inner cover 50 that closes an upper opening of the casing main body 20 to define a valve chest 23, a positive pressure valve 60 and a negative pressure valve 70 are accommodated in the valve chest 23 and function as pressure regulating valves, a cam unit 80 disposed between the casing main body 20 and the filler neck FN and functions as a diameter expansion unit, and a sealing member 100 attached to a lower outer circumference of the casing main body 20 to seal the casing main body 20 against the filler neck FN. The positive pressure valve 60 includes a valve disc 61, a valve support member 62 supporting the valve disc 61, and a coil spring 63 pressing the valve disc 61 through the valve support member 62. The negative pressure valve 70 includes a valve disc 71 and a coil spring 72 that presses against the valve disc 71. The cam unit 80 converts the rotational force of the casing main body 20 into a force in the axial direction to compress the sealing member 100 and expand the diameter of the sealing member 100, so as to seal an outer portion of the sealing member 100 against a seat surface IPa.

The pressure in the fuel tank is regulated with the positive pressure valve 60 and the negative pressure valve 70 in the following manner. In the fuel tank cap 10 attached to the filler neck FN, when the pressure in the fuel tank increases to make a differential pressure applied to the valve disc 61 exceed a predetermined level, the valve disc 61 moves up against the coil spring 63 to open the positive pressure valve 60. When the pressure in the fuel tank decreases to make a differential pressure applied to the valve disc 71 exceed a predetermined level, on the other hand, the valve disc 71 moves down to open the negative pressure valve 70. When the pressure in the fuel tank becomes positive or negative relative to the atmospheric pressure and exceeds each predetermined level, the positive pressure valve 60 or the negative pressure valve 70 opens to regulate the pressure in the fuel tank within a predetermined range relative to the atmospheric pressure.

The following describes the detailed structure of the fuel supply mechanism for the fuel tank. Referring to FIG. 2, the casing main body 20 is detachably attached to the filler neck FN, and includes a cylindrical doublelayered side wall 21, a flange 22 that is integrally formed on an upper portion of the side wall 21, and a lower cover 25 fitted in a lower opening 23a. The casing main body 20 is made by injection molding a resin material, such as polyacetal. The flange 22 has an upper fitting element 22a, which fixes the casing main body 20 to the cover 40 as discussed below.

The lower cover 25 is fixed to a circumference of the lower opening 23a of the casing main body 20, and includes a sealing side wall 25b protruding upwardly into the valve chest 23, a bottom wall 25c formed on the lower end of the sealing side wall 25b, and a seal support element 25d extending in a radial direction from the bottom wall 25c and supporting the sealing member 100. A circular seat element 25e, on which the valve disc 61 of the positive pressure valve 60 is seated and removed from, is formed on the upper end of the sealing side wall 25b.

The cover 40 is attached to the casing main body 20, and has a cup shape defined by an upper wall 41 and a side wall 42. A fitting step 42a is formed on the inner face of the side wall 42 to receive the upper fitting element 22a of the flange 22 in the casing main body 20, so that cover 40 is attached to the casing main body 20. This structure enables the cover 40 to be mounted on the casing main body 20 via the fitting step 42a and the upper fitting element 22a. A handle 43 is located above the upper wall 41 and is operated to open and close the fuel tank cap 10.

Figure 3:
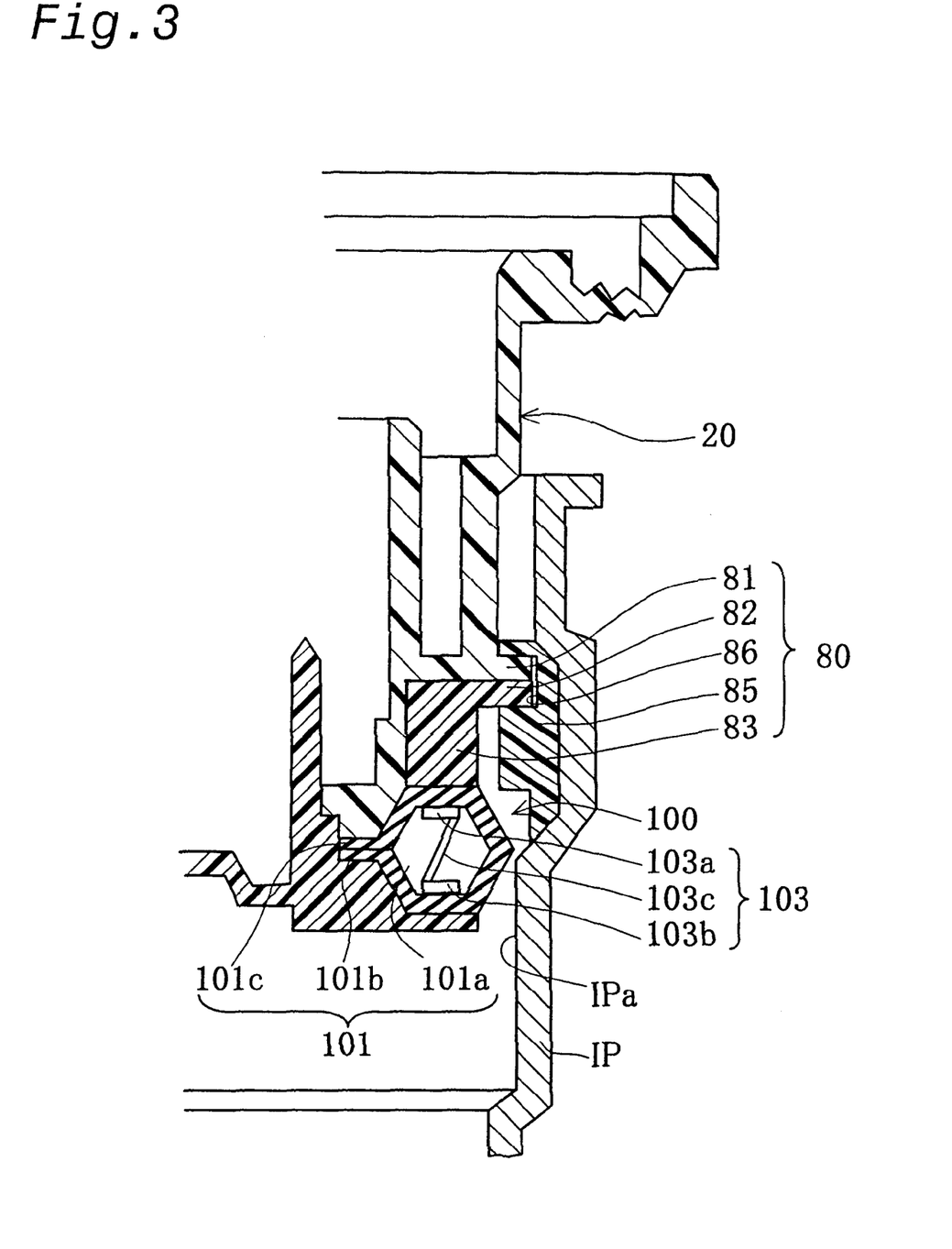
FIG. 3 is a sectional view illustrating the vicinity of a cam unit disposed in a lower portion of a casing main body included of the fuel tank cap.
Figure 4:
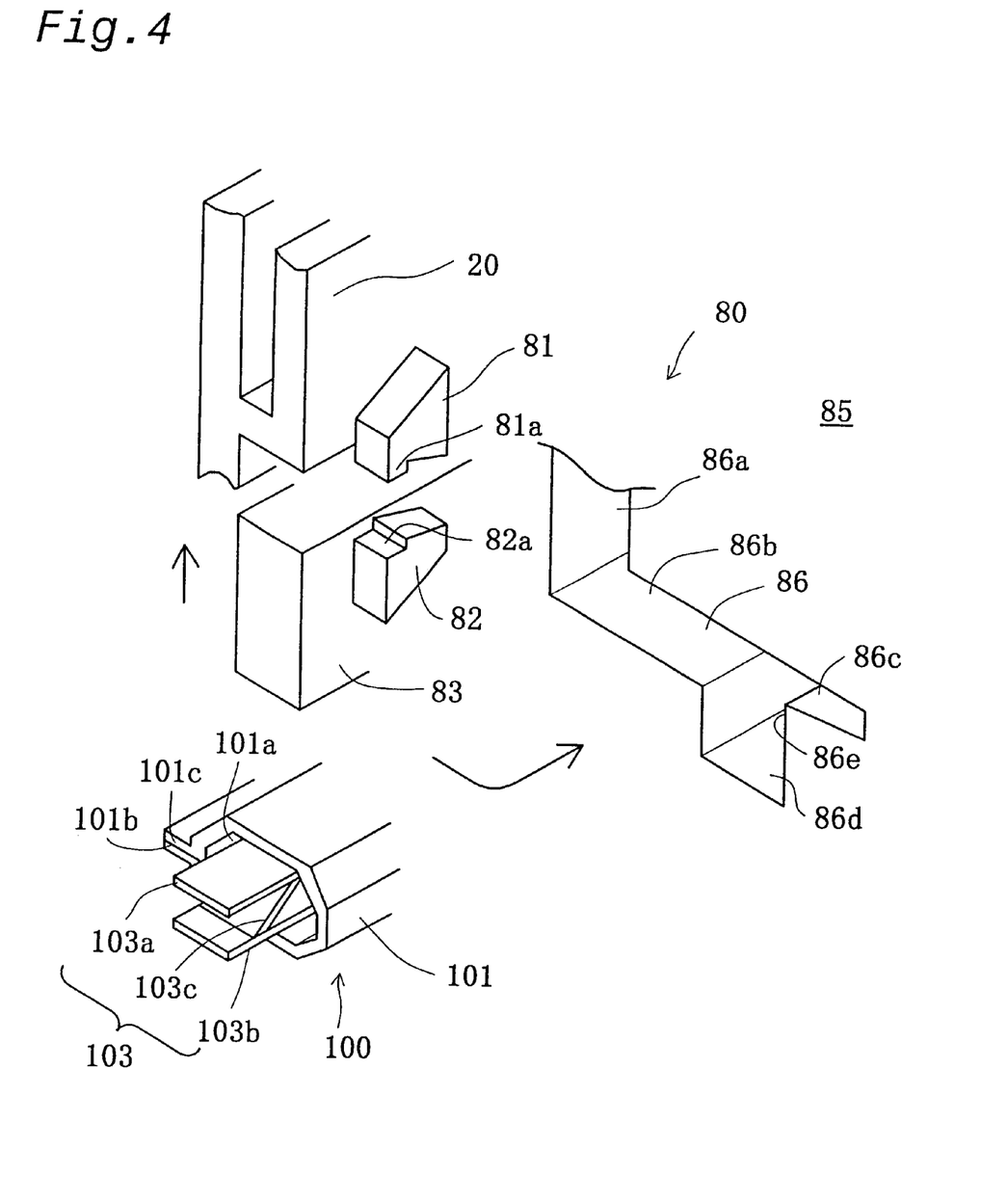
FIG. 4 is a blown-up perspective view illustrating the cam unit.

FIG. 3 is a sectional view illustrating the vicinity of the cam unit 80 disposed in the lower portion of the casing main body 20. The cam unit 80 is interposed between the lower portion of the casing main body 20 and the inlet pipe IP. FIG. 4 is a blown-up perspective view illustrating the cam unit 80. Referring to FIG. 3 and FIG. 4, the cam unit 80 presses the sealing member 100 to exert a sealing function, and includes upper cams 81 that are formed on a lower side end of the casing main body 20, a seal pressing member 83 having lower cams 82 that are pressed by the upper cams 81 to move down, and a guide member 85 having two guide grooves 86 respectively that guide both the upper cams 81 and the lower cams 82. Two sets of the upper cams 81 and the lower cams 82 are arranged to be inserted into the guide grooves 86 at a preset angle (143 degrees) in the circumferential direction of the casing main body 20. The upper cam 81 is formed with a trapezoidal shape, whereas the lower cam 82 is also formed with a substantially trapezoidal shape opposing the upper cams 81. An engagement projection 81a is formed on the bottom face of each upper cam 81, and an engagement recess 82a, which receives the engagement projection 81 a thereon, is formed on the top face of the lower cam 82.

The guide member 85 is mounted on the inner wall of the inlet pipe IP and has two guide grooves 86 that have an identical shape and respectively correspond to the two sets of the upper cams 81 and the lower cams 82. FIG. 5 shows the guide groove 86. As shown in FIG. 5A through FIG.5D, the upper cam 81 and the lower cam 82 shift along the guide groove 86 in response to an opening or closing operation of the fuel tank cap 10. In the drawings of FIG. 5, only one of the two guide grooves 86 is shown. The guide groove 86 includes a vertical leading groove 86a, a main guide groove 86b inclined at a predetermined angle relative to the leading groove 86a, a guide end groove 86c formed on an end of the main guide groove 86b and gradually tapered, and a cam shunt groove 86d formed downward between the main guide groove 86b and the guide end groove 86c. A cam stopper 86e on an upper side wall of the cam shunt groove 86d at an opening end of the guide end groove 86c is arranged to interfere with a shift of the lower cam 82 to the guide end groove 86c and guide the lower cam 82 into the cam shunt groove 86d, where the lower cam 82 collides with the cam stopper 86e and the upper cam 81 presses the cam stopper 86e down. The operation of the cam unit 80 shown in FIG. 5 will be discussed later with the opening and closing operations of the fuel tank cap 10.

Referring back to FIG. 3 and FIG. 4, the sealing member 100 performs a sealing function when pressed by the seal pressing member 83. The sealing member 100 includes a rubber seal member 101 that has a hexagonal cross section and a circular spring chamber 101a therein, a pair of extended ends 101c extending inwardly from respective ends of the rubber seal member 101 and are joined with each other, and a restoration spring 103 accommodated in the spring chamber 101a. The restoration spring 103 is inserted through an opening 101b formed between the pair of extended ends 101c.

The restoration spring 103 includes a circular upper ring 103a, a circular lower ring 103b, and a joint spring 103c that makes the upper ring 103a apart from the lower ring 103b by a predetermined distance and joins the upper ring 103a with the lower ring 103b. When a compressive force is applied to the upper ring 103a and the lower ring 103b, the joint spring 103c generates a pressing force.

When the upper face of the sealing member 100 is pressed by the seal pressing member 83, the rubber seal member 101 is compressed against the spring force of the restoration spring 103 and expands its diameter. The outer face of the rubber seal member 101 accordingly contacts the seat surface IPa to perform a sealing function. When the pressing force of the seal pressing member 83 is released from the upper face of the sealing member 100, the restoration spring 103 restores the seal rubber member 101 to its original shape.

The sealing member 100 is manufactured in the following manner. First the rubber seal member 101 is formed in the shape of a spread-out pail by injection molding, then the extended ends 101c of the rubber seal member 101 are joined with each other, and the rubber seal member 101 is folded to form the hexagonal cross section. The gap between the extended ends 101c is expanded and the joint spring 103c is inserted through the opening 101b into the spring chamber 101a. This completes the sealing member 100.

The opening and closing operations of the fuel tank cap 10 and the sealing function of the sealing member 100 are described with FIG. 5 through FIG. 8. The casing main body 20 is inserted through an inlet opening FNb of the filler neck FN while the handle 43 of the cover 40 is held with a hand in FIG. 6. The upper cam 81 and the lower cam 82 are thus inserted to the lower end of the leading groove 86a of the guide member 85 as shown in FIG. 5A. The casing main body 20 rotates relative to the inlet pipe IP with a rotation of the cover 40.

Figure 5A:
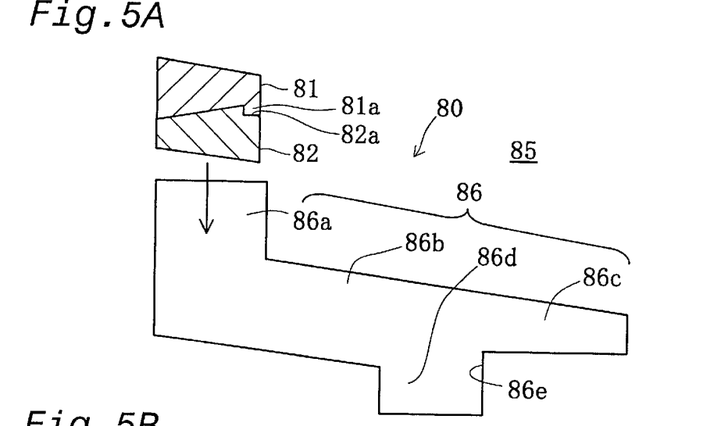
FIGS. 5A through 5D illustrate a guide groove.
Figure 5B:
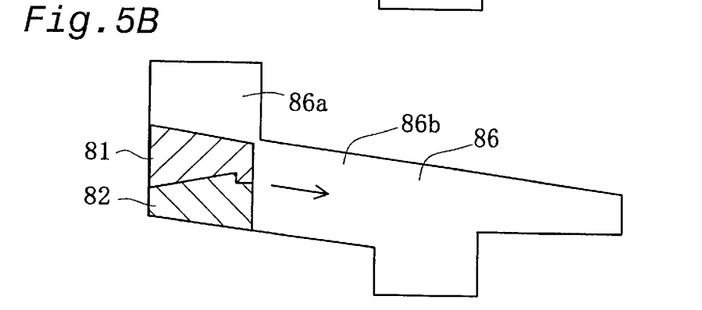
Figure 5C:
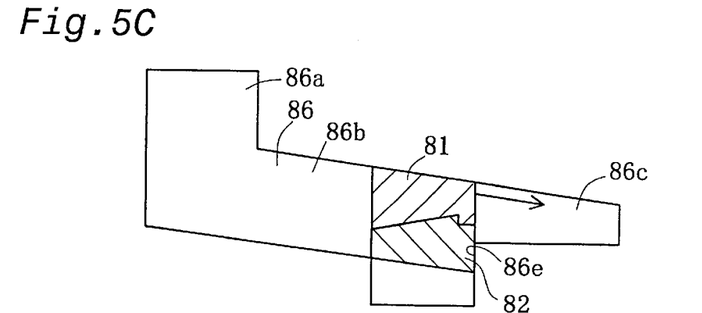
Figure 5D:
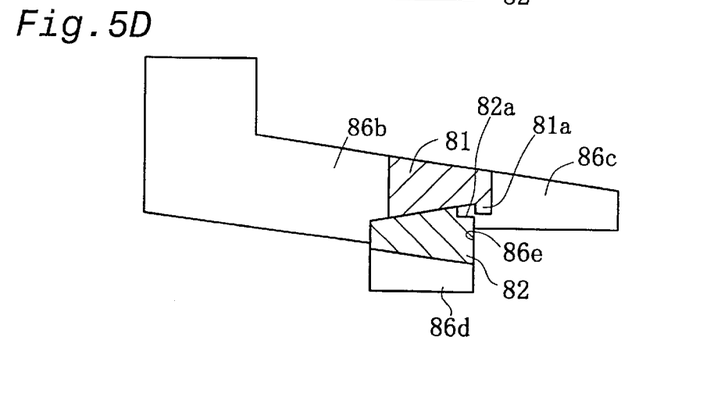
Figure 6:
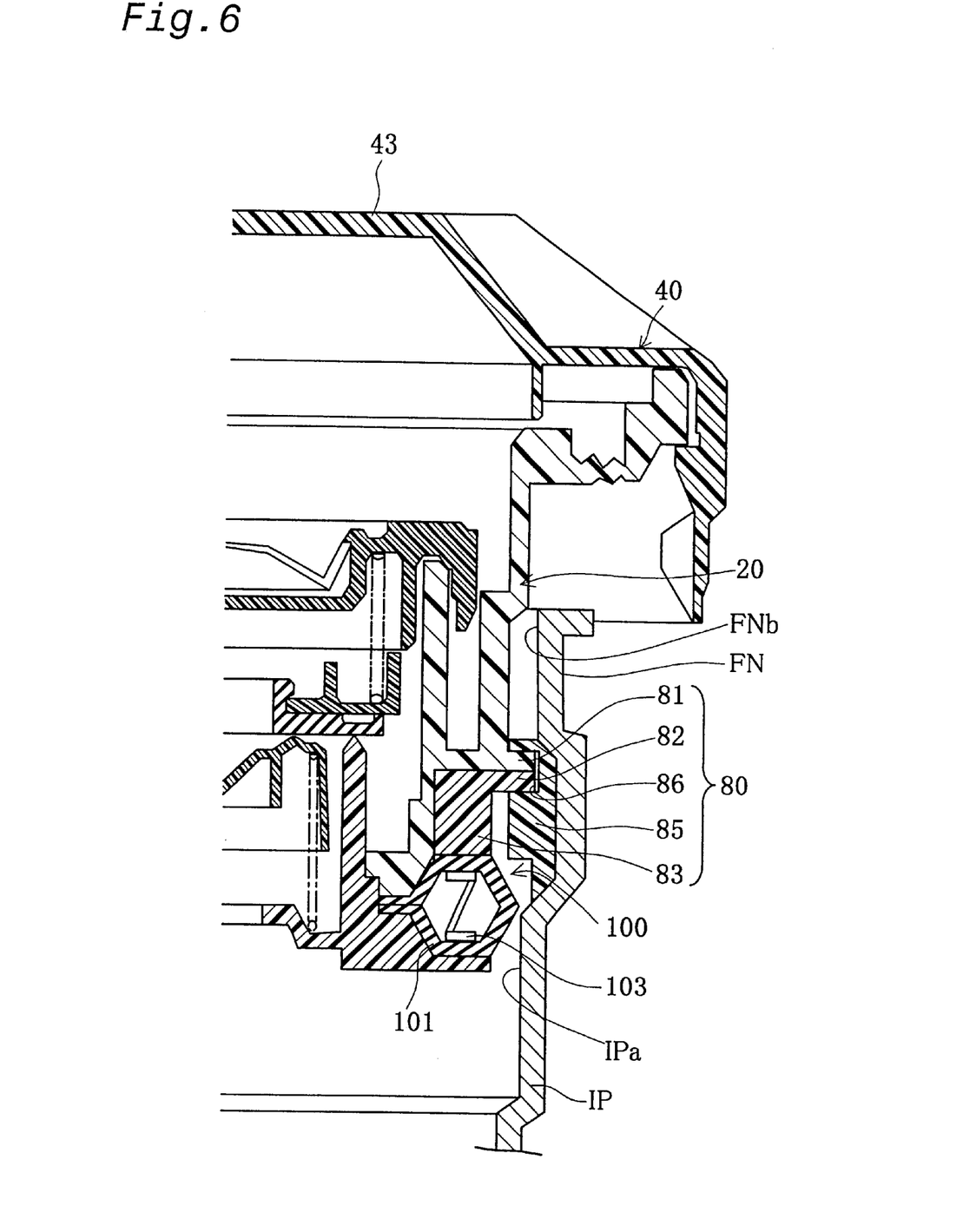
FIG. 6 shows a step of closing an inlet opening with the fuel tank cap.
Figure 7:
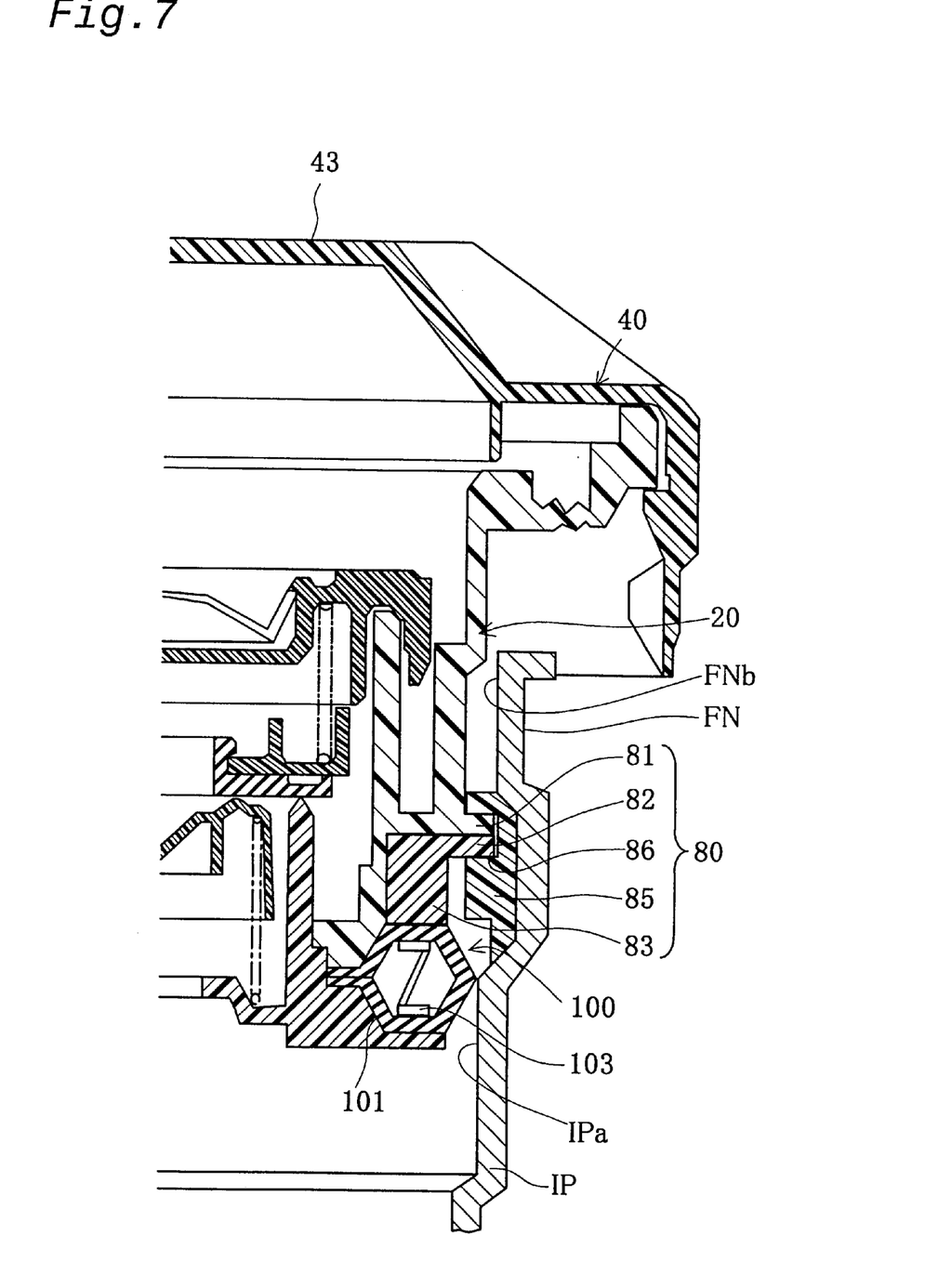
FIG. 7 shows a step subsequent to that of FIG. 6.
Figure 8:
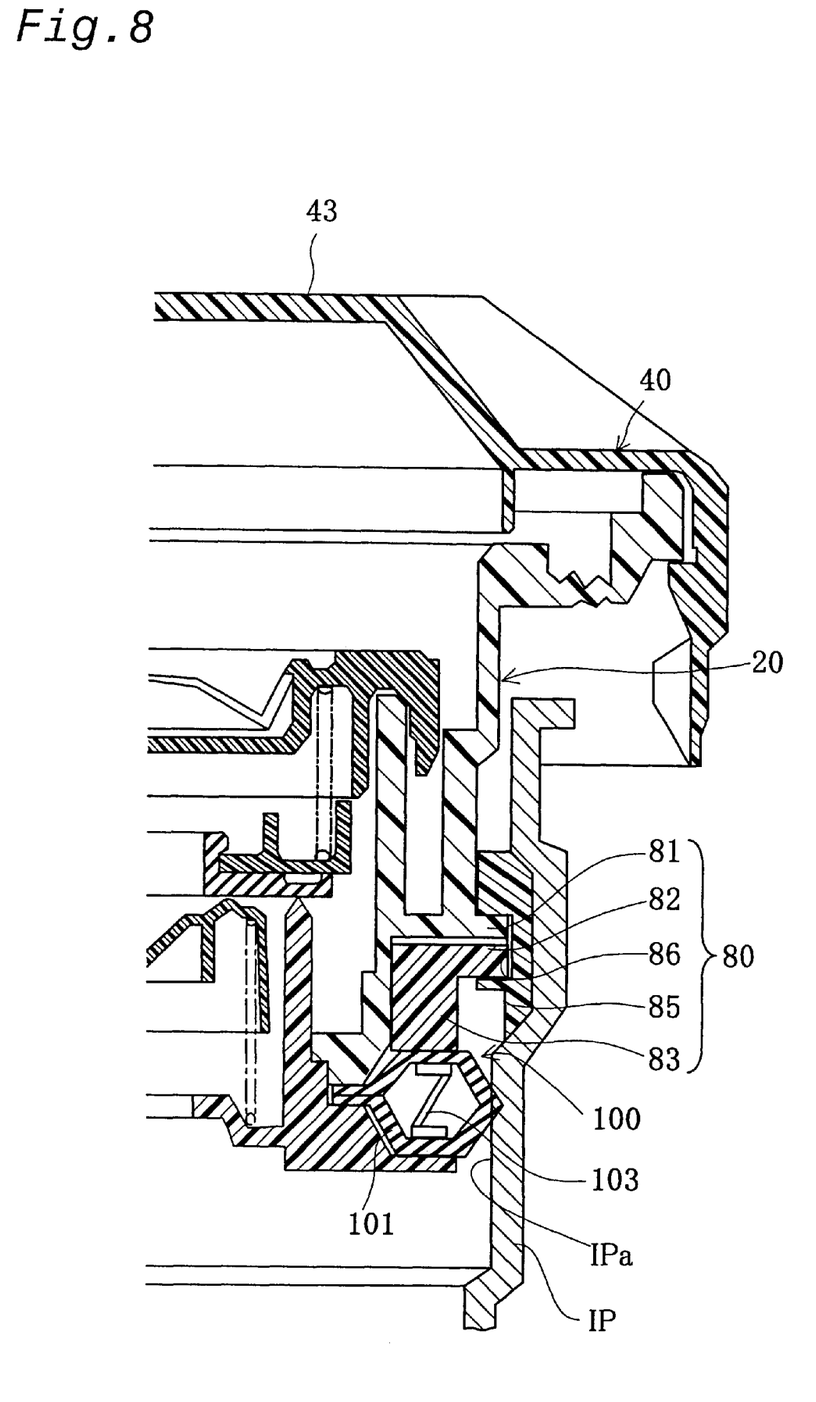
FIG. 8 shows a step subsequent to that of FIG. 7.

As the casing main body 20 rotates, the upper cam 81 and the lower cam 82 are guided along the main guide groove 86b as shown in FIG. 5B and FIG. 7, so that the casing main body 20 moves downwardly. The sealing member 100 rotates integrally with the casing main body 20. When the casing main body 20 rotates by a predetermined angle, the lower cam 82 contacts the cam stopper 86e as shown in FIG. 5C and stops at that position. As the casing main body 20 further rotates, the upper cam 81 enters the guide end groove 86c while pressing the lower cam 82 down into the cam shunt groove 86d as shown in FIG. 5D and FIG. 8. The downward shift of the lower cam 82 causes the lower end of the seal pressing member 83 to press against the sealing member 100.

The sealing member 100 is accordingly pressed against the elastic force of the restoration spring 103 and expands its diameter, so as to be in close contact with the seat surface IPa of the inlet pipe IP to thereby perform a sealing function. As the upper cam 81 and the lower cam 82 are thus positioned into the main guide groove 86b of the guide member 85, the fuel tank cap 10 is fixed to the inlet pipe IP.

When the cover 40 rotates counterclockwise to open the fuel tank cap 10, the casing main body 20 then rotates integrally with the cover 40, and the upper cam 81 moves from the position of FIG. 5D to the position of FIG. 5C. As the upper cam 81 returns to the position of FIG. 5C, the lower cam 82 comes out of the cam shunt groove 86d by the restoring force of the sealing member 100. When the casing main body 20 further rotates, the engagement projection 81a is fitted in the engagement recess 82a to integrate the upper cam 81 with the lower cam 82. The upper cam 81 and the lower cam 82 move along the main guide groove 86b and return to an end position in the leading groove 86a, at which point the cover 40 integrated with the casing main body 20 is detached from the inlet pipe IP (see FIG. 5B). The cover 40 is pulled upwardly in an axial direction at the end position, so that cover 40 integrated with the casing main body 20 is detached from the inlet pipe IP to open the inlet opening FNb. A fuel supply nozzle is then inserted through the inlet opening FNb. This enables fuel to be fed from the fuel supply nozzle through the fuel path Pa into the fuel tank.

The fuel supply mechanism having the fuel tank cap 10 has at least the following functions and effects:

(1) Since the rotational force of the casing main body 20 is converted into a force pressing the sealing member 100 strongly against the seat surface IPa via the cam unit 80, the sealing member 100 seals the fuel tank cap 10 against the seat surface IPa, so as to ensure high sealing properties between the inside and outside of the fuel tank. Since the sealing member 100 receives only uniform compressive force in the vertical direction by the cam unit 80 and does not receive any significant torsional force unlike the conventional structure, uniform sealing is ensured.

(2) Since sealing member 100 receives only compressive force but no significant torsional force, sealing member 100 has excellent durability.

(3) Since seat surface IPa is formed deep in the inlet pipe IP and is thus protected from damage due to contact with the end of a fuel supply nozzle, the seat surface IPa has high sealing properties.

(4) Since seat surface IPa is formed on the vertical wall deep in the inlet pipe IP and is washed with fuel in the course of fuel delivery, this washing effectively prevents tar from the fuel from adhering to the seat surface IPa, and maintains high sealing properties.

(5) Since sealing member 100 applies no large sliding resistance, only a small rotational torque is accordingly required to operate the fuel tank cap 10, thus ensuring excellent operatability.

Figure 9:
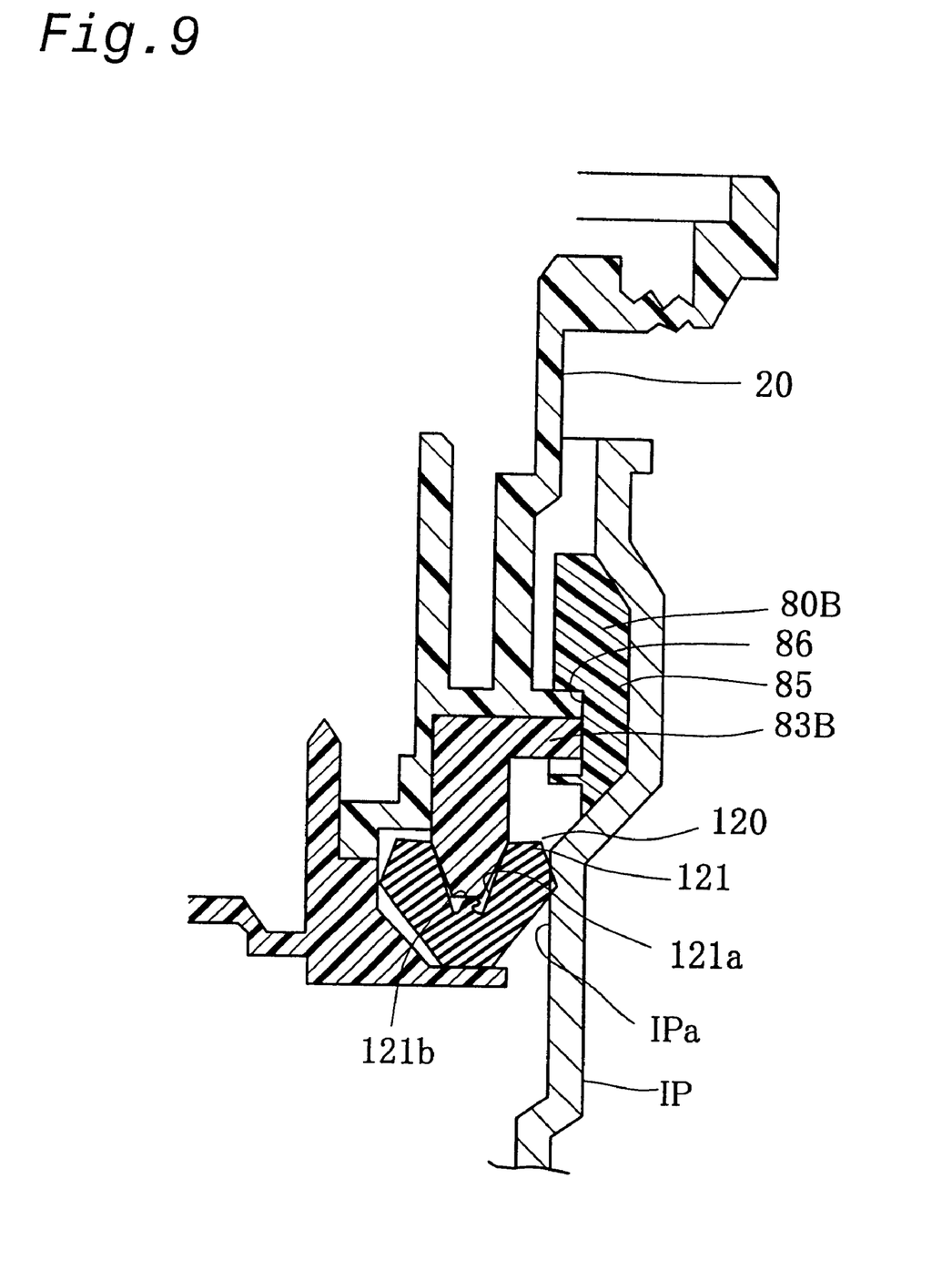
FIG. 9 is a sectional view illustrating the vicinity of another sealing member in another embodiment of the present invention.

FIG. 9 is a sectional view illustrating the vicinity of cam unit 80B of another embodiment of the present invention. The structure of sealing member 120 is characteristic of this embodiment. Referring to FIG. 9, the sealing member 120 has a rubber seal member 121 with a V-shaped cross section. An end of seal pressing member 83B is fitted in a pressure groove 121a of the rubber seal member 121. A lubricant is applied on the surface of the pressure groove 121a to smoothen the movement of seal pressing member 83B. A restoration projection 121b having spring functions is on the bottom face of pressure groove 121a. When the casing main body 20 moves downwardly, the seal pressing member 83B moves downwardly to press the rubber seal member 121 and thereby expand the diameter of the seal rubber member 121. The outer face of rubber seal member 121 having an expanded diameter is then pressed against the seat surface IPa to perform a sealing function. The restoration projection 121b is crushed by the lower end of the seal pressing member 83B and thereby generates force for restoring the sealing member 120 to its original shape. The restoring force restores the sealing member 120 to an original position thereof with the restoration force of V-shaped rubber seal member 121b. The sealing member 120 does not require any mechanical spring and thus has a simplified structure.

The present invention is not restricted to the above embodiments or their modifications, there may be many other modifications, changes, and alterations without departing from the scope or spirit of the main characteristics of the present invention.

(1) The restoration means is not restricted to these arrangements as long as the sealing member is restored to its original position and shape or nearly so. For example, the air pressure of an air-tight rubber seal member or the restoring elastic force of a rubber ring included in the seal rubber member 101 may be utilized for the same purpose.

(2) The sealing member may be attached to the inner wall of the inlet pipe, instead of being attached to the casing main body. The sealing member may be arranged at any arbitrary position and have any arbitrary shape.

Although the present invention has been described with reference to specific embodiments, one should realize that those embodiments are merely illustrative of the application of the principles of the invention. One should recognize from the above description that there are numerous modifications and rearrangements of the above-illustrated embodiments which one may devise without departing significantly from the spirit and scope of the invention.

What is claimed is:

1. A fuel supply apparatus through which a supply of fuel is supplied to a tank through a fuel path of an inlet pipe, said fuel supply apparatus comprising:

a casing main body detachably attached to said inlet pipe, said casing main body including a handle operable to open and close said fuel path and having inner and outer circumferences;

a ring-shaped sealing member interposed between said casing main body and an inner wall of said inlet pipe; and a diameter expansion unit, disposed between said casing main body and said ring-shaped sealing, said diameter expansion unit pressing said sealing member and expanding a diameter of said sealing member to seal a gap between said casing main body and said inner wall, responsive to an operation force exerted by said handle to close said fuel path.

2. The fuel supply apparatus as claimed in claim 1, wherein said diameter expansion unit comprises:

a seal pressing member that presses said sealing member so as to expand said diameter of said sealing member; and a cam unit that converts a rotational force exerted by said handle to close said fuel path into a force of pressing said sealing member via said seal pressing member.

3. The fuel supply apparatus as claimed in claim 2, wherein said cam unit comprises:

an upper cam formed on an outer circumference of said casing main body;

a lower cam formed on said seal pressing member, said lower cam being pressed by said upper cam to move downwardly; and a guide member mounted on said inlet pipe, said guide member having a guide groove, said guide groove guiding both said upper cam and said lower cam along said guide groove.

4. The fuel supply apparatus as claimed in claim 3, wherein said upper cam has an engagement projection, and said lower cam has an engagement recess for fitting said engagement projection.

5. The fuel supply apparatus as claimed in claim 2, wherein said sealing member is attached to an outer circumference of said casing main body.

6. The fuel supply apparatus as claimed in claim 5, wherein said sealing member comprises a rubber seal member including a circular spring chamber and a restoration spring disposed in said spring chamber.

7. The fuel supply apparatus as claimed in claim 6, wherein said restoration spring comprises a circular upper ring, a circular lower ring arranged apart from said upper ring by a predetermined distance, and a joint spring connecting said upper ring with said lower ring, said joint spring generating a restoring force when a compressive force is applied to said upper ring and said lower ring.

8. The fuel supply apparatus as claimed in claim 5, wherein said sealing member comprises a rubber seal member having a pressure groove with a V-shaped cross section, said pressure groove being constructed and arranged to receive an end of said seal pressing member.

9. The fuel supply apparatus as claimed in claim 8, wherein a lubricant is applied on a surface of said pressure groove to smooth movement of said seal pressing member.

10. The fuel supply apparatus as claimed in claim 9, wherein said rubber seal member has a restoration projection protruding from a bottom face of said pressure groove, said restoration projection generating a restoring force when pressed by said seal pressing member.

11. The fuel supply apparatus as claimed in claim 5, wherein said sealing member comprises an air-tight chamber, said air-tight chamber generating a restoring force when said sealing member is pressed by said seal pressing member.

12. The fuel supply apparatus as claimed in claim 1, wherein said sealing member is attached to an inner wall of said inlet pipe.

13. The fuel supply apparatus as claimed in claim 1, further comprising a seat surface on which said sealing member is to be seated, said seat surface being disposed to be invisible from an inlet opening in said fuel passage.

14. The fuel supply apparatus as claimed in claim 1, further comprising a pressure regulation valve disposed in said casing main body, said pressure regulation valve regulating a pressure in said fuel tank in a predetermined range.

15. A fuel supply apparatus through which a supply of fuel is supplied to a tank through a fuel path of an inlet pipe, said fuel supply apparatus comprising, a casing main body detachably attached to said inlet pipe said casing main body including a handle operable to open and close said fuel path;

a sealing member attached to an outer wall of said casing main body, said sealing member including a ring-shaped rubber seal member, said sealing member expanding in a radial direction when pressed in an axial direction;

a seal pressing member pressing said sealing member to expand a diameter of said sealing member; and a cam unit that converts a rotational force of said casing main body into a force of pressing said sealing member via said seal pressing member, said cam unit comprising, an upper cam disposed on said casing main body; a lower cam formed on said seal pressing member, and pressed by said upper cam to move downwardly;

a guide member mounted on said inlet pipe and having a guide groove; and said guide groove guiding said lower cam so that said sealing member is pressed by said seal pressing member when said casing main body rotates in a closing direction.

* * * * *